US009123382B1

(12) United States Patent
Abasto

(10) Patent No.: US 9,123,382 B1
(45) Date of Patent: Sep. 1, 2015

(54) NON-VOLATILE CACHING FOR SEQUENCE OF DATA

(71) Applicant: Western Digital Technologies, Inc., Irvine, CA (US)

(72) Inventor: Erick Omar Abasto, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/526,134

(22) Filed: Oct. 28, 2014

(51) Int. Cl.
G11B 21/02 (2006.01)
G11B 20/10 (2006.01)
G11B 27/36 (2006.01)

(52) U.S. Cl.
CPC ............... *G11B 20/10* (2013.01); *G11B 27/36* (2013.01); *G11B 2020/10842* (2013.01)

(58) Field of Classification Search
None
See application file for complete search history.

(56) References Cited

U.S. PATENT DOCUMENTS

| 6,018,789 | A  | 1/2000  | Sokolov et al.  |
| 6,065,095 | A  | 5/2000  | Sokolov et al.  |
| 6,078,452 | A  | 6/2000  | Kittilson et al. |
| 6,081,447 | A  | 6/2000  | Lofgren et al.  |
| 6,092,149 | A  | 7/2000  | Hicken et al.   |
| 6,092,150 | A  | 7/2000  | Sokolov et al.  |
| 6,094,707 | A  | 7/2000  | Sokolov et al.  |
| 6,105,104 | A  | 8/2000  | Guttmann et al. |
| 6,111,717 | A  | 8/2000  | Cloke et al.    |
| 6,145,052 | A  | 11/2000 | Howe et al.     |
| 6,175,893 | B1 | 1/2001  | D'Souza et al.  |
| 6,178,056 | B1 | 1/2001  | Cloke et al.    |
| 6,191,909 | B1 | 2/2001  | Cloke et al.    |
| 6,195,218 | B1 | 2/2001  | Guttmann et al. |
| 6,205,494 | B1 | 3/2001  | Williams        |
| 6,208,477 | B1 | 3/2001  | Cloke et al.    |
| 6,223,303 | B1 | 4/2001  | Billings et al. |
| 6,230,233 | B1 | 5/2001  | Lofgren et al.  |
| 6,246,346 | B1 | 6/2001  | Cloke et al.    |
| 6,249,393 | B1 | 6/2001  | Billings et al. |
| 6,256,695 | B1 | 7/2001  | Williams        |
| 6,262,857 | B1 | 7/2001  | Hull et al.     |
| 6,263,459 | B1 | 7/2001  | Schibilla       |
| 6,272,694 | B1 | 8/2001  | Weaver et al.   |
| 6,278,568 | B1 | 8/2001  | Cloke et al.    |
| 6,279,089 | B1 | 8/2001  | Schibilla et al.|
| 6,289,484 | B1 | 9/2001  | Rothberg et al. |
| 6,292,912 | B1 | 9/2001  | Cloke et al.    |
| 6,310,740 | B1 | 10/2001 | Dunbar et al.   |
| 6,317,850 | B1 | 11/2001 | Rothberg        |
| 6,327,106 | B1 | 12/2001 | Rothberg        |

(Continued)

OTHER PUBLICATIONS

Thomas A. Roden, et al., U.S. Appl. No. 13/174,760, filed Jun. 30, 2011, 23 pages.

*Primary Examiner* — Tan X Dinh

(57) ABSTRACT

Operation of a Data Storage Device (DSD) including a Non-Volatile Semiconductor Memory (NVSM) and at least one disk. A size value is determined corresponding to a sequence of data to be read from or stored in the DSD. If the size value is less than a threshold value, the sequence of data is stored in the NVSM. If the size value is greater than the threshold value, a first portion of the sequence of data is stored in the NVSM and at least a remaining portion of the sequence of data is stored on the at least one disk. The threshold value is based on at least a preparation time for accessing data from the at least one disk and a throughput value of the NVSM for storing data in or retrieving data from the NVSM.

25 Claims, 4 Drawing Sheets

(56) References Cited

U.S. PATENT DOCUMENTS

| | | |
|---|---|---|
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |

(56) References Cited

U.S. PATENT DOCUMENTS

| | | |
|---|---|---|
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |

(56) References Cited

U.S. PATENT DOCUMENTS

| | | | |
|---|---|---|---|
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,332,695 B2 | 12/2012 | Dalphy et al. | |
| 8,341,312 B2* | 12/2012 | Alatorre et al. | 710/33 |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,458,526 B2 | 6/2013 | Dalphy et al. | |
| 8,462,466 B2 | 6/2013 | Huber | |
| 8,467,151 B1 | 6/2013 | Huber | |
| 8,489,841 B1 | 7/2013 | Strecke et al. | |
| 8,493,679 B1 | 7/2013 | Boguslawski et al. | |
| 8,498,074 B1 | 7/2013 | Mobley et al. | |
| 8,499,198 B1 | 7/2013 | Messenger et al. | |
| 8,504,771 B2 | 8/2013 | Dawkins | |
| 8,512,049 B1 | 8/2013 | Huber et al. | |
| 8,514,506 B1 | 8/2013 | Li et al. | |
| 8,531,791 B1 | 9/2013 | Reid et al. | |
| 8,554,741 B1 | 10/2013 | Malina | |
| 8,560,759 B1 | 10/2013 | Boyle et al. | |
| 8,565,053 B1 | 10/2013 | Chung | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,589,773 B1 | 11/2013 | Wang et al. | |
| 8,593,753 B1 | 11/2013 | Anderson | |
| 8,595,432 B1 | 11/2013 | Vinson et al. | |
| 8,599,510 B1 | 12/2013 | Fallone | |
| 8,601,248 B2 | 12/2013 | Thorsted | |
| 8,611,032 B2 | 12/2013 | Champion et al. | |
| 8,612,650 B1 | 12/2013 | Carrie et al. | |
| 8,612,706 B1 | 12/2013 | Madril et al. | |
| 8,612,798 B1 | 12/2013 | Tsai | |
| 8,619,383 B1 | 12/2013 | Jung et al. | |
| 8,621,115 B1 | 12/2013 | Bombet et al. | |
| 8,621,133 B1 | 12/2013 | Boyle | |
| 8,626,463 B2 | 1/2014 | Stevens et al. | |
| 8,630,052 B1 | 1/2014 | Jung et al. | |
| 8,630,056 B1 | 1/2014 | Ong | |
| 8,631,188 B1 | 1/2014 | Heath et al. | |
| 8,634,158 B1 | 1/2014 | Chahwan et al. | |
| 8,635,412 B1 | 1/2014 | Wilshire | |
| 8,640,007 B1 | 1/2014 | Schulze | |
| 8,654,619 B1 | 2/2014 | Cheng | |
| 8,661,193 B1 | 2/2014 | Cobos et al. | |
| 8,667,248 B1 | 3/2014 | Neppalli | |
| 8,670,205 B1* | 3/2014 | Malina et al. | 360/69 |
| 8,683,295 B1 | 3/2014 | Syu et al. | |
| 8,683,457 B1 | 3/2014 | Hughes et al. | |
| 8,687,306 B1 | 4/2014 | Coker et al. | |
| 8,693,133 B1 | 4/2014 | Lee et al. | |
| 8,694,841 B1 | 4/2014 | Chung et al. | |
| 8,699,159 B1 | 4/2014 | Malina | |
| 8,699,171 B1 | 4/2014 | Boyle | |
| 8,699,172 B1 | 4/2014 | Gunderson et al. | |
| 8,699,175 B1 | 4/2014 | Olds et al. | |
| 8,699,185 B1 | 4/2014 | Teh et al. | |
| 8,700,850 B1 | 4/2014 | Lalouette | |
| 8,743,502 B1 | 6/2014 | Bonke et al. | |
| 8,749,910 B1 | 6/2014 | Dang et al. | |
| 8,751,699 B1 | 6/2014 | Tsai et al. | |
| 8,755,141 B1 | 6/2014 | Dang | |
| 8,755,143 B2 | 6/2014 | Wilson et al. | |
| 8,756,361 B1 | 6/2014 | Pruett et al. | |
| 8,756,382 B1 | 6/2014 | Carlson et al. | |
| 8,769,593 B1 | 7/2014 | Elliott et al. | |
| 8,773,802 B1 | 7/2014 | Anderson et al. | |
| 8,780,478 B1 | 7/2014 | Huynh et al. | |
| 8,782,334 B1* | 7/2014 | Boyle et al. | 711/111 |
| 8,793,532 B1 | 7/2014 | Tsai et al. | |
| 8,797,669 B1 | 8/2014 | Burton et al. | |
| 8,799,977 B1 | 8/2014 | Kapner, III et al. | |
| 8,819,375 B1 | 8/2014 | Pruett et al. | |
| 8,825,976 B1* | 9/2014 | Jones | 711/165 |
| 8,825,977 B1* | 9/2014 | Syu et al. | 711/165 |
| 2009/0113702 A1 | 5/2009 | Hogg | |
| 2010/0199036 A1 | 8/2010 | Siewert et al. | |
| 2010/0306288 A1 | 12/2010 | Stein et al. | |
| 2010/0306464 A1* | 12/2010 | Dawkins | 711/114 |
| 2010/0306551 A1 | 12/2010 | Meyer et al. | |
| 2011/0010514 A1 | 1/2011 | Benhase et al. | |
| 2011/0226729 A1 | 9/2011 | Hogg | |
| 2012/0137061 A1* | 5/2012 | Yang et al. | 711/105 |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0132638 A1 | 5/2013 | Horn et al. | |
| 2014/0201424 A1 | 7/2014 | Chen et al. | |
| 2015/0010143 A1* | 1/2015 | Yang | 380/28 |

\* cited by examiner

NON-VOLATILE CACHING FOR SEQUENCE OF DATA

BACKGROUND

Data storage systems are often used to record data onto or to reproduce data from a storage media. Some data storage systems include multiple types of storage media. In the case of a Solid-State Hybrid Drive (SSHD), the SSHD may include a rotating magnetic disk for storing data and a Non-Volatile Semiconductor Memory (NVSM), such as a Solid-State Drive (SSD), a flash memory, and/or a NAND memory utilized in addition to the disk.

In such SSHDs, the NVSM can act as a cache for storing a copy of data that can be quickly accessed from the NVSM. However, the size of the NVSM is often limited due to a higher cost of the NVSM as compared to the disk. Thus, there is often a need to make efficient use of the NVSM.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
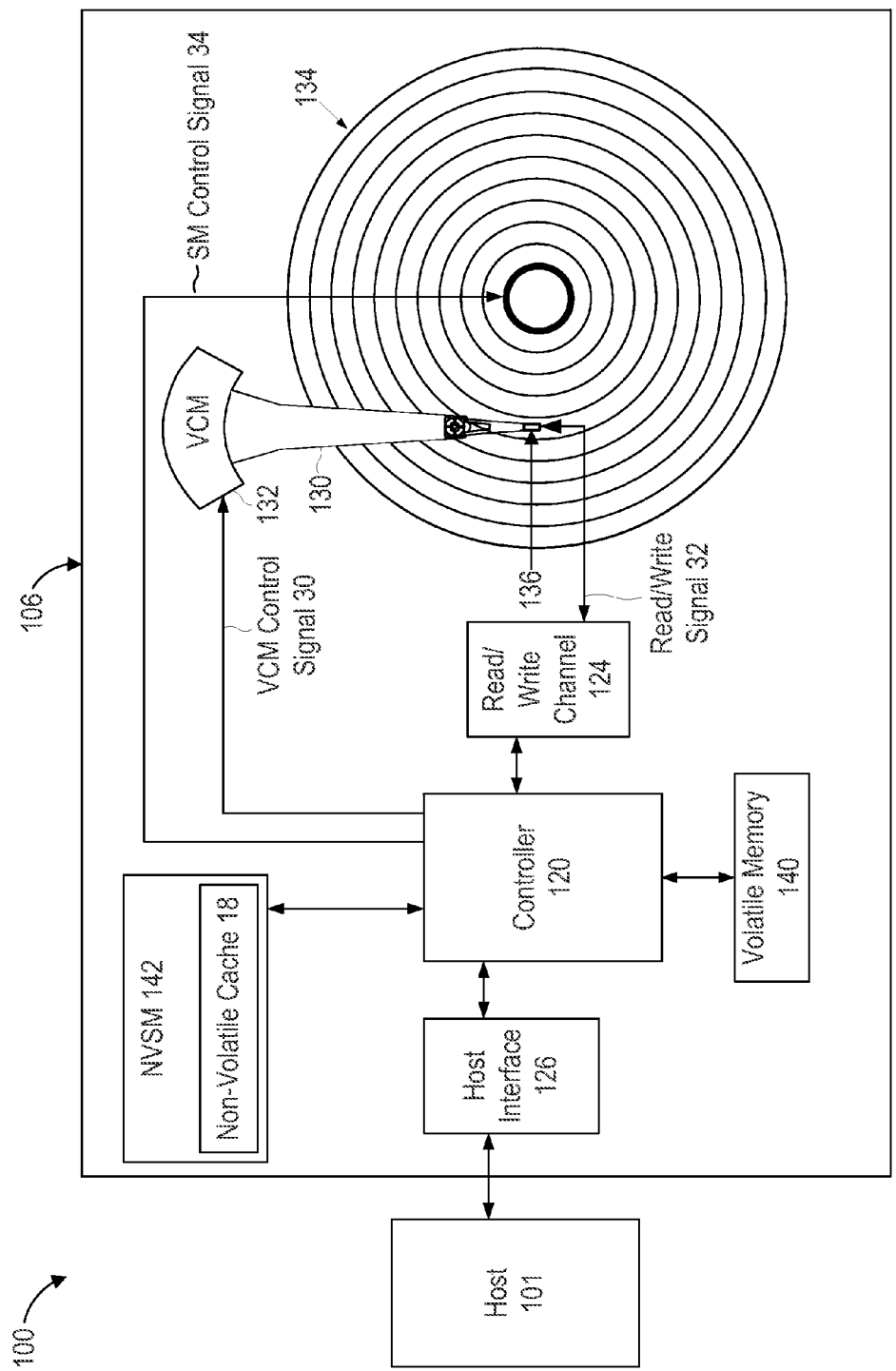
FIG. 1 is a block diagram depicting a Data Storage Device (DSD) according to an embodiment.

FIG. 1 shows system 100 according to an embodiment that includes host 101 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both Non-Volatile Semiconductor Memory (NVSM) 142 and disk 134 for storing data. In this regard, DSD 106 can be considered a Solid-State Hybrid Drive (SSHD) in that it includes both solid-state Non-Volatile Memory (NVM) media and magnetic disk NVM media. In other embodiments, each of disk 134 or NVSM 142 may be replaced by multiple Hard Disk Drives (HDDs) or multiple Solid-State Drives (SSDs), respectively, so that DSD 106 includes pools of HDDs or SSDs.

DSD 106 includes controller 120 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk 134 is rotated by a spindle motor (not shown). DSD 106 also includes head 136 connected to the distal end of actuator 130, which is rotated by Voice Coil Motor (VCM) 132 to position head 136 in relation to disk 134. Controller 120 can control the position of head 136 and the rotation of disk 134 using VCM control signal 30 and SM control signal 34, respectively.

As appreciated by those of ordinary skill in the art, disk 134 may form part of a disk pack with additional disks radially aligned below disk 134. In addition, head 136 may form part of a head stack assembly including additional heads with each head arranged to read data from and write data to a corresponding surface of a disk in a disk pack.

Disk 134 includes a number of radial spaced, concentric tracks for storing data on a surface of disk 134. The tracks on disk 134 may be grouped together into zones of tracks with each track divided into a number of sectors that are spaced circumferentially along the tracks.

In addition to disk 134, the NVM media of DSD 106 includes NVSM 142 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (Fe RAM), Magnetoresistive RAM (MRAM), other discrete NVM chips, or any combination thereof.

As shown in FIG. 1, NVSM 142 includes non-volatile cache 18 which can store copies of data stored on disk 134 for quicker access to the data. In some implementations, non-volatile cache 18 may also store data that is not stored on disk 134. In this regard, data can often be accessed quicker from non-volatile cache 18 than from disk 134 since there is often latency in accessing data from disk 134. Latencies in accessing data from disk 134 can include, for example, the time it takes to position head 136 over a particular portion of disk 134, to rotate or spin up disk 134 to an operational speed, or to exit a low power or standby mode of DSD 106.

As discussed in more detail below, by storing a portion or all of a sequence of data in non-volatile cache 18, it is ordinarily possible to improve the performance of DSD 106 in servicing read commands from host 101 since the data stored in non-volatile cache 18 can often be accessed quicker than data stored on disk 134. In addition, a size value of the sequence of data can be used to determine how much of the sequence of data to store in non-volatile cache 18 to ordinarily make more efficient use of non-volatile cache 18 as discussed below.

In FIG. 1, volatile memory 140 can include, for example, a Dynamic Random Access Memory (DRAM), which can be used by DSD 106 to temporarily store data. Data stored in volatile memory 140 can include data read from NVM media (e.g., disk 134 or NVSM 142), data to be written to NVM media, instructions loaded from a firmware of DSD 106 for execution by controller 120, or data used in executing a firmware. In this regard, such firmware can include instructions for execution by controller 120 to implement the data caching and data access processes discussed below. The firmware may also be stored on NVM such as NVSM 142 or disk 134.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in NVSM 142, controller 120 receives data from host interface 126 or from disk 134, and may buffer the data in volatile memory 140. In one implementation, the data is then encoded into charge values for charging cells (not shown) of NVSM 142 to store the data.

In response to a read command for data stored in NVSM 142, controller 120 in one implementation reads current values for cells in NVSM 142 and decodes the current values into data that can be transferred to host 101. Such data may be buffered by controller 120 before transferring the data to host 101 via host interface 126.

For data to be written to disk 134, read/write channel 124 can encode the buffered data into write signal 32 which is provided to head 136 for magnetically writing data to the surface of disk 134.

In response to a read command for data stored on disk 134, controller 120 positions head 136 via VCM control signal 30 to magnetically read the data stored on the surface of disk 134. Head 136 sends the read data as read signal 32 to read/write channel 124 for decoding, and the data is buffered in volatile memory 140 for transferring to host 101.

Data Caching Examples

Figure 2A:
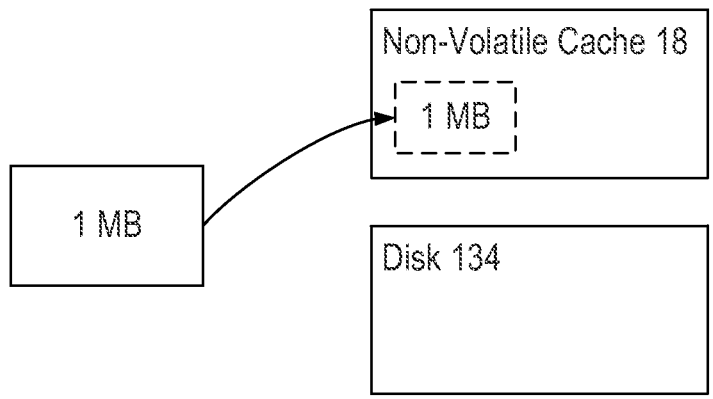
FIG. 2A is a conceptual diagram illustrating the storage of a sequence of data in a non-volatile cache according to an embodiment.

FIG. 2A is a conceptual diagram illustrating the storage of a sequence of data in non-volatile cache 18 according to an embodiment. In the example of FIG. 2A, a 1 MB sequence of data is to be stored in or read from the NVM of DSD 106. If the sequence of data is read from disk 134 or is to be stored in NVM of DSD 106, the data caching processes discussed below can determine whether to store all or part of the sequence of data in non-volatile cache 18. As used herein, a sequence of data can refer to data that is associated with a mostly contiguous range of logical addresses such as Logical Block Addresses (LBAs) used by host 101. The sequence of data to be stored in FIG. 2A can form part of one or more write commands received from host 101 or can be data that is being requested from disk 134 by one or more read commands from host 101.

Controller 120 can identify the data as a sequence of data by, for example, using logical addresses for the data that may be indicated in one or more read or write commands. As discussed in more detail below, controller 120 may then determine whether a size value corresponding to the stream of data is less than a threshold value for caching or storing all or a portion of the sequence of data in non-volatile cache 18 of NVSM 142. The size value may relate to an amount of data to be read from or written to NVM, such as a number of bytes, commands, LBAs, or sectors for the sequence of data.

In the example of FIG. 2A, the 1 MB sequence of data is equal to or less than the threshold value. All of the sequence of data is then stored in non-volatile cache 18 as indicated by the arrow in FIG. 2A.

The data stored in non-volatile cache 18 can ordinarily be quickly accessed from non-volatile cache 18 without having to wait for a preparation time or time until DSD 106 is ready to access data from disk 134. The preparation time for accessing data from disk 134 can include one or more of a time for disk 134 to spin up to an operational speed, a time for DSD 106 to awake from a standby or low power mode, or a time to position head 136 over a particular location on disk 134 (i.e., a seek time).

Although FIG. 2A does not show any of the sequence of data being stored on disk 134, in some implementations, a copy of the data sequence is also stored on disk 134 for redundancy.

In some embodiments, host 101 rather than controller 120 can determine where to store the data sequence. In such embodiments, host 101 can execute, for example, driver software that can request information from DSD 106 to steer the data sequence to a particular NVM of DSD 106. Such steering can be accomplished through the use of hinting from host 101 where host 101 can assign different priorities to data to indicate where the data should be stored in DSD 106.

The threshold value can be based on at least the preparation time for disk 134 and a throughput value of NVSM 142 for storing data in or retrieving data from NVSM 142. In one example, the preparation time can be an average seek time for head 136 to access data from disk 134. If NVSM 142 has a throughput of 120 MB per second for a command size of 512 sectors, then a throughput of NVSM 142 can be expressed in terms of 512 byte sectors as 120 MB/second divided by 512 B/sector to yield an equivalent throughput in terms of sectors as 245,760 sectors per second.

If DSD 106 has an average seek time of 13 ms per command, then the equivalent of 3,194.88 sectors could be stored in NVSM 142 during an average seek time of 13 ms (0.013 seconds×245,760 sectors). With a command size of 512 sectors, that would mean that 6.24 commands (3,194.88 sectors/ 512 sectors per command) could be stored in non-volatile cache 18 during the average seek time of head 136. The threshold value can then be set to 6 commands. In other implementations using the same example characteristics of DSD 106, the threshold value could be set to 3,194 sectors or 1.63 MB (3,194 sectors×512 bytes per sector).

By setting the threshold value based on a preparation time for accessing data from disk 134 and a throughput of NVSM 142, it is ordinarily possible to generally reduce the amount of time to access data from DSD 106 while conserving space in non-volatile cache 18 by not having to store all of a sequence of data in non-volatile cache 18.

Figure 2B:
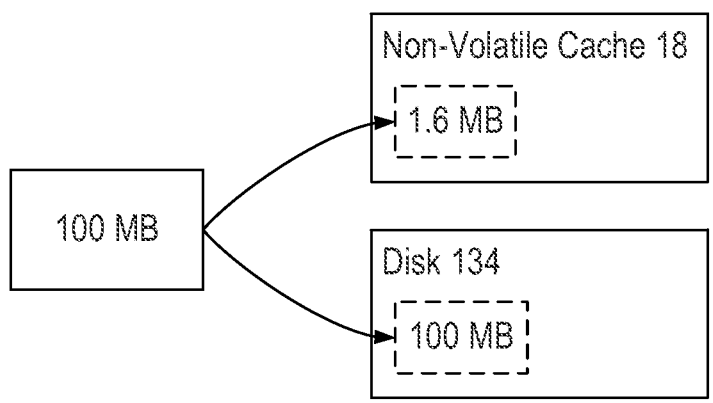
FIG. 2B is a conceptual diagram illustrating the storage of a first portion of a sequence of data in a non-volatile cache and the storage of at least a remaining portion of the sequence of data on at least one disk according to an embodiment.

FIG. 2B provides an example where the size value corresponding to the sequence of data is greater than the threshold value according to an embodiment. In the example of FIG. 2B, a sequence of data with a size value of 100 MB is to be stored in NVM of DSD 106. In other implementations, the size value could be expressed in terms of sectors, bytes, or commands.

In the example of FIG. 2B, the threshold value is set to 1.63 MB and a first portion of the sequence of data that is equal to the threshold value of 1.63 MB is stored in non-volatile cache 18. At least a remaining portion of the 100 MB sequence of data is stored on disk 134.

In some embodiments, the storing of the first portion in non-volatile cache 18 and the storing of the remaining portion on disk 134 can be synchronized so that the first portion is stored in non-volatile cache 18 during the preparation time for storing the remaining portion on disk 134. However, in some examples, it may be possible to store the remaining portion on disk 134 while the first portion is still being stored in non-volatile cache 18 if head 136 can be positioned within the preparation time.

In the example of FIG. 2B, the full 100 MB of the sequence of data is stored or kept on disk 134 for redundancy or for synchronization purposes when later accessing the sequence of data from both non-volatile cache 18 and disk 134. In other embodiments, only a remaining portion of the sequence of data (i.e., 98.37 MB) or an amount of data between the full amount of 100 MB and the remaining portion of 98.37 MB may be stored on disk 134.

By storing only the first portion of the sequence of data in non-volatile cache 18, it is ordinarily possible to take advantage of the quick random access of NVSM 142 while still conserving space in non-volatile cache 18. The remaining portion of the sequence of data that is stored on disk 134 can then take advantage of the relatively fast access speed of sequential accesses from disk 134 once head 136 is in position. Although random accesses from NVSM 142 may typically be faster than random accesses from disk 134 for random read and write commands, disk 134 can be as fast or even faster than NVSM 142 for sequential reads and writes once head 136 is in position on disk 134. Thus, storing the remaining portion of a sequence of data provides much less of a benefit in terms of speed of access than storing the first portion of the sequence of data.

Figure 3:
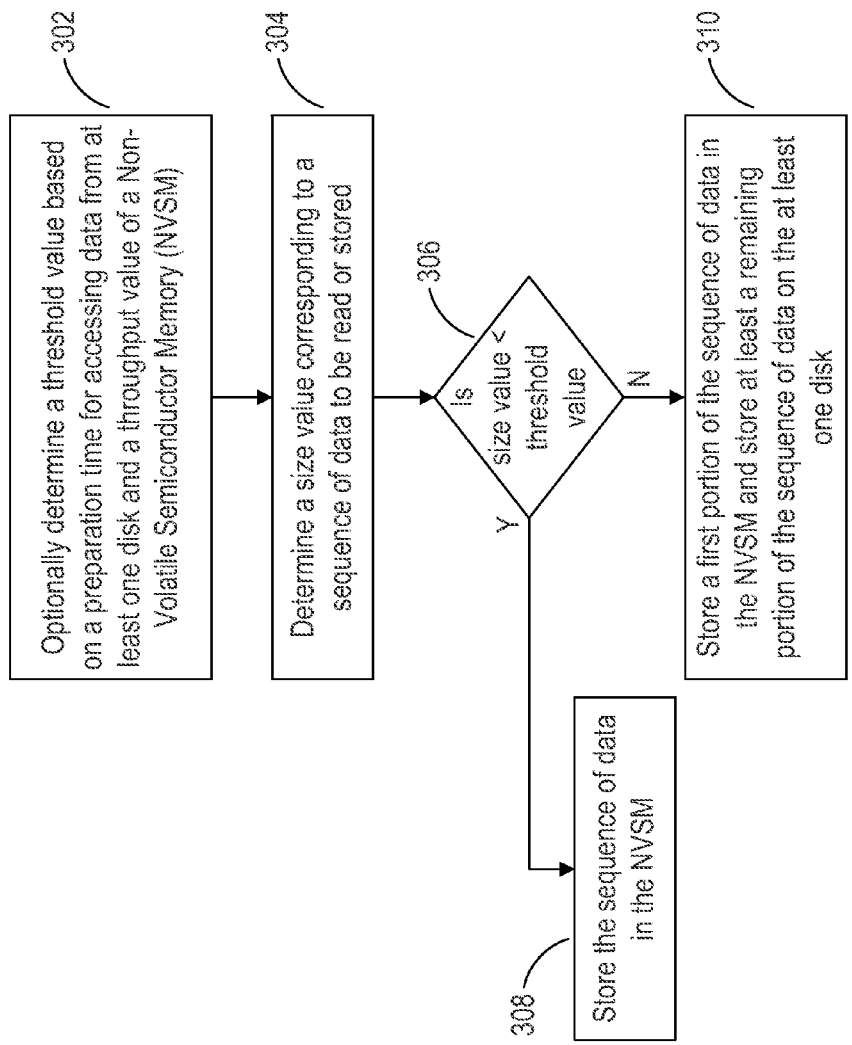
FIG. 3 is a flowchart for a caching process according to an embodiment.

FIG. 3 is a flowchart for a data caching process that can be performed by controller 120 or host 101 according to an embodiment. In block 302, a threshold value is optionally determined based on a preparation time for accessing data from disk 134 and a throughput value of NVSM 142. Block 302 may be performed once by DSD 106 during operation or may be performed periodically while DSD 106 is in the field as its performance or available data capacity changes. In other embodiments, block 302 may be omitted if the threshold value is preset at the factory without changing the threshold value while DSD 106 is in the field.

In block 304, a size value is determined corresponding to a sequence of data to be read from or written to NVM of DSD 106. The sequence of data may be identified by controller 120 or by host 101 as a range of contiguous or sequential LBAs exceeding a certain number of LBAs. The size value can correspond to an amount of data (e.g., bytes, sectors or LBAs) to be read or written for the sequence of data or a number of queued commands for reading or writing the sequence of data. Controller 120 or host 101 may determine the size value based on information included in one or more read or write commands for the sequence of data such as LBAs included in the one or more commands.

In block 306, controller 120 or host 101 determines whether the size value corresponding to the sequence of data is less than the threshold value. If so, the sequence of data is stored in NVSM 142 in block 308. On the other hand, if the size value is not less than the threshold value, a first portion of the sequence of data is stored in NVSM 142 and at least a remaining portion of the sequence of data is stored on disk 134. As noted above, storing the first portion in non-volatile cache 18 can occur during a preparation time for storing the remaining portion on disk 134. Storing the remaining portion may then occur after the preparation time elapses or, in some cases, may occur during the preparation time if head 136 can be positioned within the preparation time.

As discussed above, some implementations may only store the remaining portion of the sequence of data on disk 134. Other implementations may store more than the remaining portion or may store all of the sequence of data on disk 134 with a backup copy of the first portion. Storing more than the remaining portion on disk 134 can allow for redundancy or for synchronization when switching between accessing the first portion from NVSM 142 and the remaining portion from disk 134.

Data Access Examples

Figure 4:
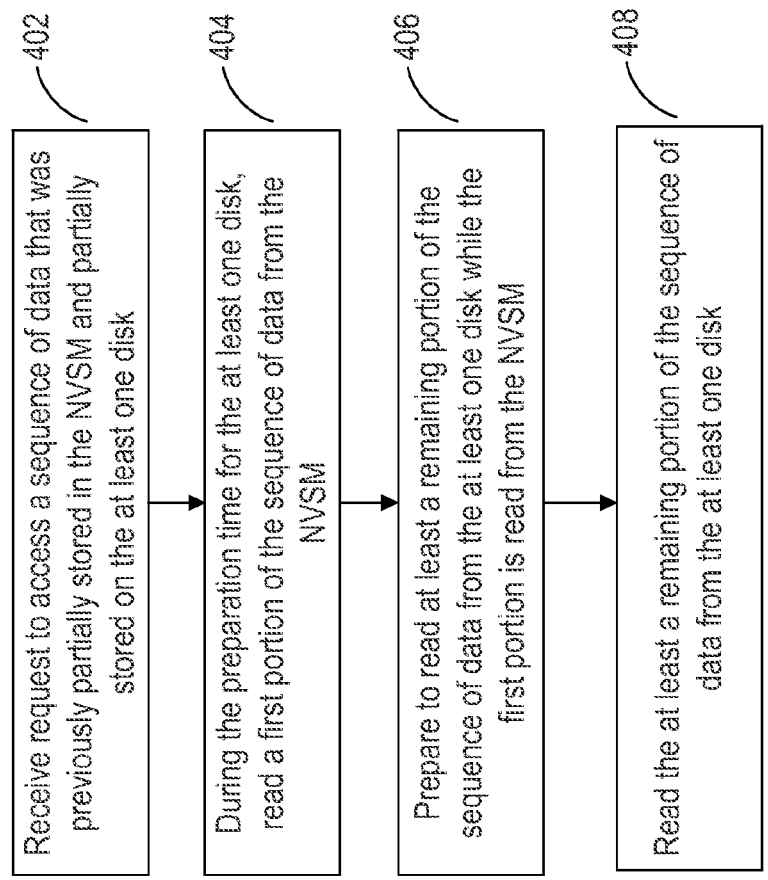
FIG. 4 is a flowchart for a data access process according to an embodiment.

FIG. 4 is a flowchart for a data access process that can be performed by controller 120 according to an embodiment. In block 402, a request (e.g., one or more read commands) is received from host 101 to access a sequence of data that was previously partially stored in non-volatile cache 18 of NVSM 142 and partially stored on disk 134. Controller 120 may use a mapping table or other addressing scheme to identify the locations where the first portion and the remaining portion are stored in DSD 106. In one such implementation, LBAs from a read command for the sequence of data can be used to identify physical addresses such as Physical Block Addresses (e.g., PBAs) indicating physical locations for the data in NVSM 142 or disk 134.

In block 404, controller 120 reads the first portion of the sequence of data from non-volatile cache 18 of NVSM 142 during the preparation time to read the remaining portion from disk 134. As discussed above, the preparation time can include an average time to access data from disk 134 including a seek time to position head 136 over disk 134, a time to spin up disk 134 to an operational speed, or a time to access data after a low power or standby state of DSD 106.

In block 406, controller 120 prepares to read at least the remaining portion of the sequence of data from disk 134 while the first portion is read in block 404. Controller 120 may prepare to read at least the remaining portion by, for example, controlling actuator 130 to move head 136 into position for reading or spinning up disk 134.

In block 408, controller 120 controls head 136 to read at least the remaining portion of the sequence of data from disk 134. As noted above, more than the remaining portion may be read from disk 134 so that the reading of the remaining portion can be synchronized with the reading of the first portion from NVSM 142.

By using the foregoing data access process, it is ordinarily possible to improve an overall data access time for DSD 106 since the first portion can be accessed quickly from NVSM 142 without any of the mechanical latency associated with accessing data from disk 134. In addition, by accessing the remaining portion from disk 134 the available data capacity of non-volatile cache 18 can be conserved without incurring much delay since head 136 is typically ready to access the remaining portion from disk 134 with a relatively fast sequential reading from disk 134.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one disk for storing data;
   at least one head for reading data from or storing data on the at least one disk;
   a Non-Volatile Semiconductor Memory (NVSM) for storing data; and
   a controller configured to:
      determine a size value corresponding to a sequence of data to be read from or stored in the DSD;
      if the size value is less than a threshold value, store the sequence of data in the NVSM; and
      if the size value if greater than the threshold value, store a first portion of the sequence of data in the NVSM and control the at least one head to store at least a remaining portion of the sequence of data on the at least one disk;
      wherein the threshold value is based on at least:
         a preparation time for accessing data on the at least one disk, and
         a throughput value of the NVSM for storing data in or retrieving data from the NVSM.

2. The DSD of claim 1, wherein the size value corresponds to an amount of data to be read from or stored in the DSD.

3. The DSD of claim 1, wherein the size value corresponds to a number of queued commands for reading data from or storing data in the DSD.

4. The DSD of claim 1, wherein the size value of the first portion of the sequence of data is equal to the threshold value.

5. The DSD of claim 1, wherein the first portion of the sequence of data is stored in both the at least one disk and the NVSM.

6. The DSD of claim 1, wherein if the sequence of data is accessed after storing the first portion of the sequence of data in the NVSM and storing the at least a remaining portion of the sequence of data on the at least one disk, the controller is further configured to:
   read the first portion of the sequence of data from the NVSM during the preparation time for accessing data from the at least one disk, and
   prepare to read the at least a remaining portion of the sequence of data from the at least one disk while the first portion of the sequence of data is read from the NVSM.

7. The DSD of claim 1, wherein the controller is further configured to synchronize reading or storing the first portion of the sequence of data in the NVSM with reading or storing the at least a remaining portion of the sequence of data on the at least one disk.

8. The DSD of claim 1, wherein the controller is further configured to store the sequence of data in the NVSM if the size value equals the threshold value.

9. The DSD of claim 1, wherein the controller is further configured to store the first portion of the sequence of data in the NVSM and control the at least one head to store the at least a remaining portion of the sequence of data on the at least one disk if the size value equals the threshold value.

10. A method of operating a Data Storage Device (DSD) including a Non-Volatile Semiconductor Memory (NVSM) and at least one disk, the method comprising:
    determining a size value corresponding to a sequence of data to be read from or stored in the DSD;
    if the size value is less than a threshold value, storing the sequence of data in the NVSM; and
    if the size value is greater than the threshold value, storing a first portion of the sequence of data in the NVSM and storing at least a remaining portion of the sequence of data on the at least one disk;
    wherein the threshold value is based on at least:
       a preparation time for accessing data from the at least one disk, and
       a throughput value of the NVSM for storing data in or retrieving data from the NVSM.

11. The method of claim 10, wherein the size value corresponds to an amount of data to be read from or stored in the DSD.

12. The method of claim 10, wherein the size value corresponds to a number of queued commands for reading data from or storing data in the DSD.

13. The method of claim 10, wherein the size value of the first portion of the sequence of data is equal to the threshold value.

14. The method of claim 10, wherein the first portion of the sequence of data is stored in both the at least one disk and the NVSM.

15. The method of claim 10, wherein if the sequence of data is accessed after storing the first portion of the sequence of data in the NVSM and storing the at least a remaining portion of the sequence of data on the at least one disk, the method further comprises:
   reading the first portion of the sequence of data from the NVSM during the preparation time for accessing data from the at least one disk, and
   preparing to read the at least a remaining portion of the sequence of data from the at least one disk while the first portion of the sequence of data is read from the NVSM.

16. The method of claim 10, further comprising synchronizing reading or storing the first portion of the sequence of data in the NVSM with reading or storing the at least a remaining portion of the sequence of data on the at least one disk.

17. The method of claim 10, further comprising storing the sequence of data in the NVSM if the size value equals the threshold value.

18. The method of claim 10, further comprising storing the first portion of the sequence of data in the NVSM and storing the at least a remaining portion of the sequence of data on the at least one disk if the size value equals the threshold value.

19. A host in communication with a Data Storage Device (DSD) including at least one disk for storing data and a Non-Volatile Semiconductor Memory (NVSM) for storing data, the host comprising:
   an interface for communicating with the DSD; and
   a processor configured to:
      determine a size value corresponding to a sequence of data to be read from or written to the DSD;
      if the size value is less than a threshold value, store the sequence of data in the NVSM; and
      if the size value is greater than the threshold value, store a first portion of the sequence of data in the NVSM and at least a remaining portion of the sequence of data on the at least one disk;
   wherein the threshold value is based on at least:
      a preparation time for accessing data from the at least one disk, and
      a throughput value of the NVSM for storing data in or retrieving data from the NVSM.

20. The host of claim 19, wherein the size value corresponds to an amount of data to be read from or written to the DSD.

21. The host of claim 19, wherein the size value corresponds to a number of queued commands for reading data from or writing data to the DSD.

22. The host of claim 19, wherein the size value of the first portion of the sequence of data is equal to the threshold value.

23. The host of claim 19, wherein the first portion of the sequence of data is stored in both the at least one disk and the NVSM.

24. The host of claim 19, wherein the processor is further configured to store the sequence of data in the NVSM if the size value equals the threshold value.

25. The host of claim 19, wherein the processor is further configured to store the first portion of the sequence of data in the NVSM and store the at least a remaining portion of the sequence of data on the at least one disk if the size value equals the threshold value.

* * * * *